Sept. 30, 1969        R. S. BLOUGH ET AL        3,469,816
MOLD FOR MAKING SLOTTED CONCRETE FLOORS FOR ANIMAL HOUSES
Filed May 2, 1967                               2 Sheets-Sheet 1
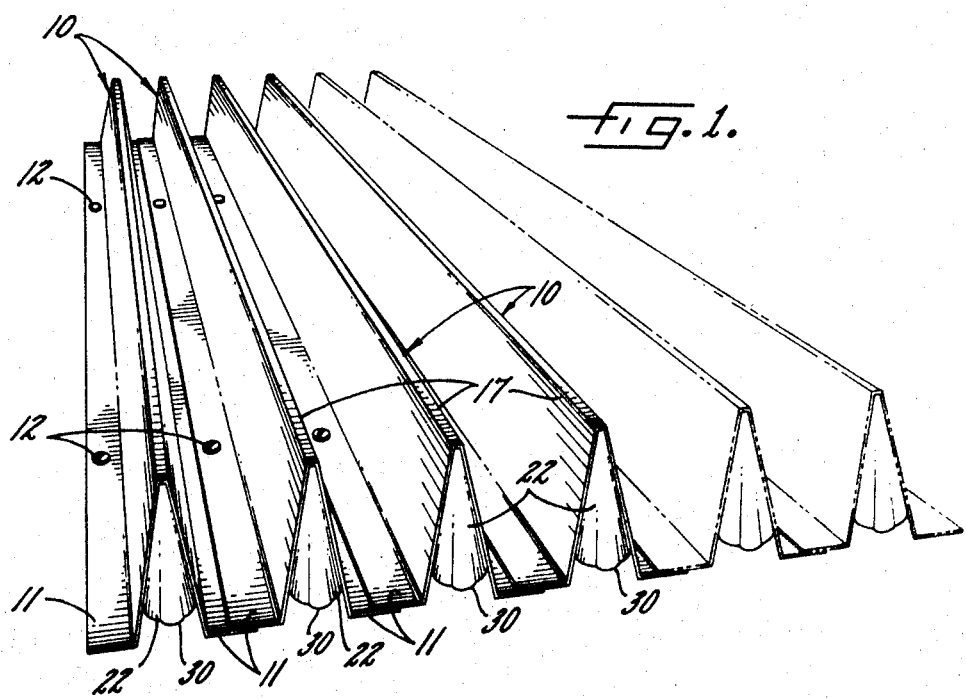
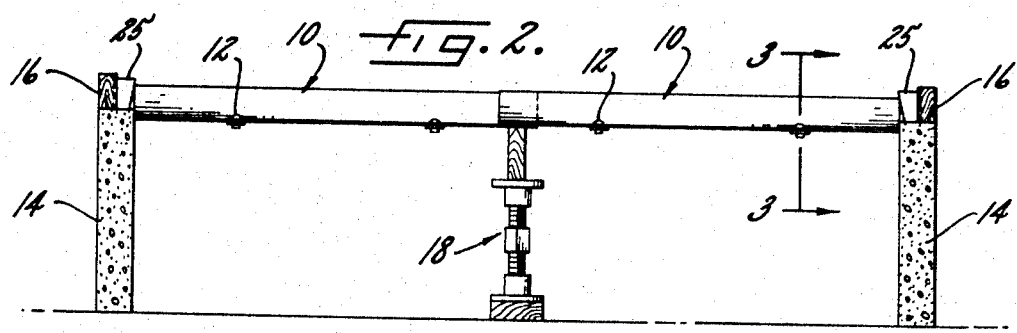
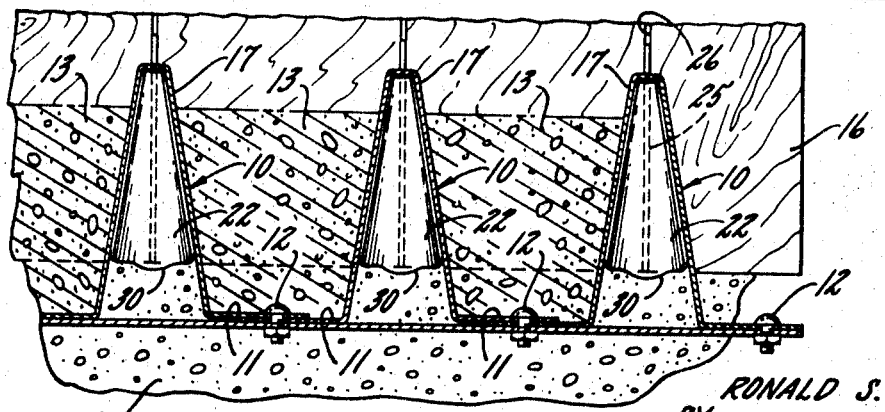
INVENTOR.
RONALD S. BLOUGH,
BY Wolfe, Hubbard, Voit & Osann
ATTORNEYS.

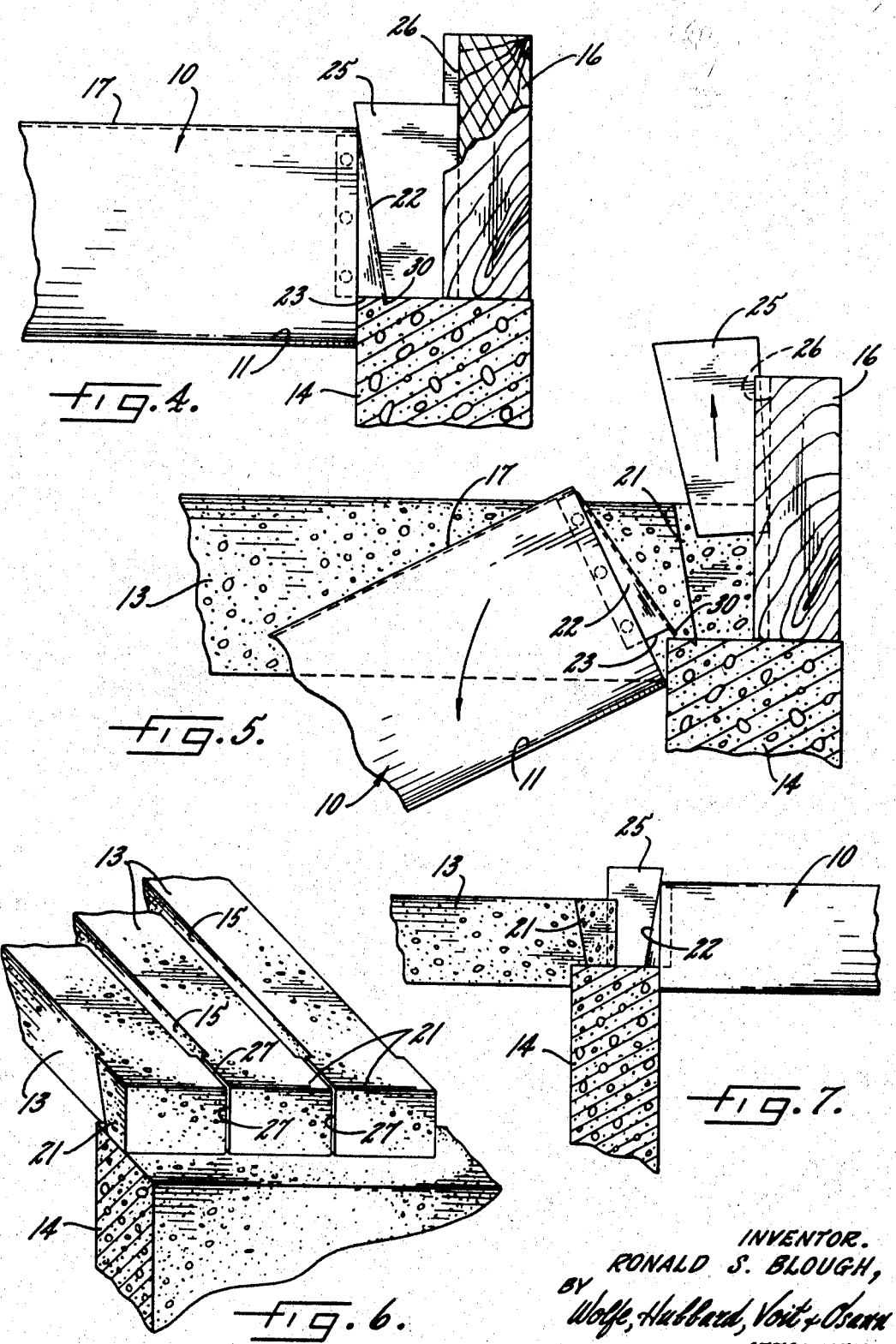

United States Patent Office 3,469,816
Patented Sept. 30, 1969

3,469,816
MOLD FOR MAKING SLOTTED CONCRETE FLOORS FOR ANIMAL HOUSES
Ronald S. Blough, Fairfield, Iowa, and Albert E. Gehlbach, Lincoln, Ill., assignors to Fairfield Engineering and Manufacturing Company, Fairfield, Iowa, a corporation of Iowa
Filed May 2, 1967, Ser. No. 635,580
Int. Cl. E04g *11/36*
U.S. Cl. 249—118                                          6 Claims

ABSTRACT OF THE DISCLOSURE

A mold having individual sections assemblable into multiple-beam units for casting slotted concrete livestock floors is described, being characterized by removable end dams whereby each concrete beam may be cast as a removable unit, and by a means for staking the mold sections to their respective end supports to prevent shifting during assembly and pouring.

---

This invention relates to farm buildings and in particular to the floors of livestock confinement houses.

Modern methods of producing livestock for market demand a clean, sanitary environment in which the animal confinement area is maintained relatively free of litter and animal wastes. In the case of heavier livestock, such as cattle and hogs, this has been accomplished through the use of floors having a plurality of relatively narrow slots through which wastes may pass, but which are not wide enough to affect the footing of the animals. Beneath the slotted floor, waste disposal or containment means are then provided to take care of the waste material. These include tanks or lagoons which can be used to turn the wastes into liquid fertilizer, a useful by-product.

Slotted floors of the type described have been constructed of wood, metal, and concrete. The first two materials have disadvantages which are easily apparent. Wood floors of this type have a relatively short life and tend to become slippery and softened by impregnation from the waste matter which does not pass through the slots. Metal is susceptible to corrosion, and the hard smooth surface of a metal floor member is generally quite slippery, especially when wet, and may result in animal injury due to falls.

Concrete has been generally accepted as a preferable material for slotted livestock floors, being strong, durable, and affording a firm, skid-resistant footing for livestock. However, this material has disadvantages of weight and difficulty of assembly when floor slats are furnished to the farmer in the precast condition. It is accordingly preferable to cast the slotted floor sections in situ, using reusable molds. Such molds are usually of metal and may be conveniently set up at the site for use. After the concrete has been poured and allowed to harden, the molds are removed and re-used for the next job. Where a large floor is to be cast the molds may be set up one section at a time, with the same molds being used for an adjoining section after the first section is completed.

The quality and utility of a cast concrete floor made in this manner depends on the type of mold in which it is cast. It the cast sections are too large they are prone to cracking during freezing conditions and cannot be conveniently removed if an individual slat in the slotted floor section should become damaged. This difficulty of removal also makes difficult or impossible the inspection or servicing of the waste disposal system beneath the slotted floor. These difficulties can be met by making each slat of the floor a separate unit, but until now it has been possible to assemble such floors only from individual precast units with their attendant cost, weight, and difficulty of assembly.

An additional difficulty exists with previous molds for such units because the individual mold sections, when assembled prior to pouring, have a tendency to slip out of alignment as additional sections are added or as the concrete is poured. This leads to skewing of the individual concrete slats and to leakage and dripping of concrete through gaps due to warpage of the molds.

In view of the foregoing, it is a principal object of the present invention to provide a mold for casting slotted concrete livestock floors which allows the casting of a plurality of individual concrete slats at a single pouring, whereupon the mold may be broken away for re-use after the concrete has hardened. A related object is to provide for the casting of one or more individual adjoining slats connected at their ends, or as single slats, as desired. It is further intended to provide such a mold which does not require the use of accessory concrete dams to prevent spillage of liquid concrete from the ends of the slat sections. This allows the casting of individual concrete slats immediately adjacent the slats which had been previously cast, without the use of forms at the interface which would otherwise be left in place to avoid the creation of an undesirable gap between individual sections of the completed floor.

A further object of the present invention is to provide a metal mold for the production of slatted concrete livestock floors which mold may be rigidly yet removably secured relative to its supports to prevent shifting during assembly or pouring of the concrete. To this end it is intended that the mold be easily secured to its support by a simple hammer blow or the like, while still being separable from the cast structure in the usual manner after the concrete has set.

Other objects and advantages of the invention will become apparent upon reading the following detailed description and upon reference to the drawings, in which:

FIG. 1 is a perspective of a mold section constructed according to the present invention;

FIG. 2 is a side elevation of a pair of mold sections joined and placed in position for the pouring of concrete showing the associated support members and forms;

FIG. 3 is an enlarged partial section taken in the plane 3—3 of FIG. 2;

FIG. 4 is an enlarged partial section of the end portion of the mold section of FIG. 1, also illustrated in conjunction with support members and forms as used in the pouring of concrete;

FIG. 5 is a section similar to FIG. 4, illustrating how the mold sections and end dams are broken away after the pouring of the concrete floor;

FIG. 6 is a partial perspective of a completed section of a slotted concrete floor with the mold sections removed; and FIG. 7 is a partial section similar to FIG. 4, except on a reduced scale and illustrating the mold section in position for the casting of a second concrete floor section adjacent the first.

While the invention will be described in connection with a preferred embodiment, it will be understood that we do not intend to limit the invention to that embodiment, but intend to cover all alternative and equivalent constructions as may be included within the spirit and scope of the invention as defined by the appended claims.

Turning first to FIG. 1, there is shown a mold constructed according to the present invention for forming slotted concrete livestock floors. In construction, the mold comprises a plurality of individual V-shaped channels 10 which have widened flanges 11 extending outwardly from the broad part of the V. These flanges are perforated to receive bolts 12 which secure the individual channels 10 together to form cavities or troughs in which each individual concrete slat 13 is formed.

To set up the mold for use as shown in FIG. 2, a pair of support members 14 are placed horizontally in position on the site where the floor is to be cast. The support members 14 themselves are generally of cast concrete construction. An assembled section of V channels 10 is placed in position relative to a pair of support members 14 and an upright form member 16 is placed at each end to contain the concrete. The interior of the mold is then given a coating of a suitable lubricant, such as ordinary motor oil, to prevent the mold from sticking to the concrete, thereby assuring easy removal of the mold after the slats 13 have been cast. After the concrete has been poured, but before it has set, it is smoothed over so that the thin point 17 of each of the V channels 10 protrudes through the cement. These gaps then become the slots 15 in the completed floor shown in FIG. 6, through which the wastes may drain.

After the concrete has set and the individual slats 13 are formed, the mold is broken away from the cast floor section from underneath and removed. For this purpose, the V channels 10 are comprised of two nesting sections which may be telescoped to form cast floor slats of varying lengths. As shown in FIG. 2, the sections are supported generally at their midpoint where there is a degree of section overlap by jacks 18 or other suitable supports. After the concrete has been poured and allowed to harden, the jacks 18 are removed and a sharp tap from a hammer or other instrument is usually sufficient to break the mold into two sections which may be pulled down and away from the completed slats 13 as shown in FIG. 5.

To allow additional strength at the end of each cast concrete slat 13, a widened portion 21 is provided in each slat beyond the termination of the slot 15 formed by the thin point 17 of the V channel 10. It may therefore be seen that the slot 15 does not extend throughout the full length of the slat 13, but only over the unsupported area of the slat which overlies the trough or lagoon below. The widened end portions 21 are therefore completely supported over their width by the support member 14.

To prevent the entrance of concrete into the open ends of the metal V channels 10, closures 22 are provided. In the illustrated embodiment, as best shown in FIGS. 3, 4 and 5, the closure comprises a conical section of bent metal which extends beyond the squared-off end of the V channel and terminates somewhat short of the lower edge of the V channels 10 and the flanges 11 to define a notch 23. The closures 22 are secured to the ends of the V channels 10 by any suitable means, such as spot-welding. In use, the notch is engaged against the corner of the support member 14 and the resulting cast concrete slats 13 are therefore formed with a ledge or overhang which securely and positively locates them with respect to the support member 14, thereby preventing shifting or slippage on a longitudinal axis. Alternatively, the closure 22 may be formed of flat metal, and the notch 23 may be formed in the lower corner of the V channel 10 itself.

As a principal feature of the invention, provision is made whereby each slat 13 may be cast as an individual unit, thereby allowing it to be removed later by itself should replacement be necessary or in the event that access to the underlying trough or lagoon is required. Alternatively, it is possible to cast two, three or more slats as a single unit at the same time, with adjoining slats being cast as similar multiple units. This is accomplished by the provision of sheet metal dams 25 which fit into abutting relationship with the closures 22 and the form members 16. The dams 25 are located by the provision of individual vertical slots 26 in the form members 16 at each point where a division between individual slats 13 is desired. The dam 25, in the illustrated embodiment, is simply slipped into the precut slot 26 in the form member 16 when the mold is assembled, with the workman being sure that the dam is slipped far enough into the slot so as to make sealing contact with both the support member 14 and the closure 22. The upper edge of the dam 25 extends above the level of the poured concrete, assuring that the adjacent slats 13 will be cast as separate units and allowing the dam to be knocked loose later for re-use.

In the pouring of a multi-section concrete floor, the mold is set up as previously described using form members 16 constructed of wood, such as 2 x 4's or 2 x 6's, with the individual slots 26 being precut in the form members as desired. After the first floor section has been poured and the concrete allowed to harden, the jacks 18 are removed and the mold is knocked away from the completed concrete slats 13 by a sharp downward blow at the tip 17 of the V channels 10 near the center of the mold with a hammer or similar implement. The mold then breaks away at its center, and is pulled down and away from the completed slats 13 as shown in FIG. 5. The mold for the next adjacent section is then set up in a similar fashion as shown in FIG. 7, with the last slat 13 of the preceding section being fitted into engagement with the first V channel 10 of the mold for the next section.

After the required number of adjacent sections in the first row has been poured, the next adjoining row of sections is poured in a similar manner, except that the preceding row of concrete slats 13 takes the place of the wooden form member 16 for the next row. This is achieved simply by knocking the dams 25 out from between the preceding cast slats 13 to leave gaps 27, and reversing them in the slots thereby created so as to engage and seal the closures 22 of the mold when positioned for casting the next row of slats 13. In other words, the gaps 27 left by the removal of the dams 25 from the preceding groups of slats 13 form the slots into which the dams 25 are placed for the next row.

Pursuant to a further aspect of the invention, the V channels 10 of the mold are provided with a means whereby they may be temporarily staked or anchored with respect to the support members 14 to prevent shifting or slippage during assembly or pouring of concrete. This is achieved by providing a small ridge or tooth 30 at the end of each V channel 10, preferably as part of the closure member 22. In the illustrated embodiment, this consists of a shallow extension at the outer periphery of the conical sheet metal closure 22.

In use, the V channels 10 are placed in position against the supports 14 and a light hammer blow is directed at each end adjacent the closure 22. This is sufficient to drive the tooth 30 slightly into the supporting member 14, thereby providing a rigid location for the mold during later operations. After the concrete has been poured and allowed to harden the tooth 30 is easily disengaged by the slight upward movement of the channel 10 as the mold sections break apart and swing downward after the jacks 18 have been removed, as shown in FIG. 5. The pivoting of the channel 10 about the corner of the support member 14 tends to lift the notch 23 and the tooth 30 away from the support member thereby freeing the tooth 30 and allowing the mold to slip down and away from the completed floor section.

We claim as our invention:
1. A mold for making a slotted concrete floor comprising, in combination, a central section having a pair of parallel inverted V channels bridged at their lower adjacent edges by a connecting member to define a trough, said central section being openable approximately at its midpoint to facilitate breaking the mold away from a completed cast floor section, a support member at each end of the central section, said inverted V channels being bridged at each end by a closure terminating in a horizontal notch adapted to engage and overhang a corner of the support member, an upright form member overlying each support member and spaced from the central section and closures, said form member having an upright slot opposite the closures of one of said V channels, and a dam member received in said slot in abutting relationship to its adjacent closure and support member to define one side of a mold cavity for an individual concrete floor section.

2. A mold as defined in claim 1 in which one of said closures includes a tooth protruding below the overhanging edge of said notch, whereby said central section may be temporarily staked to its respective support member during assembly.

3. A mold as defined in claim 1 in which each of said inverted V channels comprises an individual unit adapted for assembly with other like units into multiple-section molds.

4. A mold as defined in claim 1 in which each of said inverted V channels is substantially square-ended, and in which each of said closures comprises a conical section having a lower edge which intersects the squared-off end of its respective channel at a point above its lower edge, thereby defining the said horizontal notch.

5. A mold as defined in claim 4 in which one of said closures includes a tooth protruding below the overhanging edge of said notch, whereby said central section may be temporarily staked to its respective support member during assembly.

6. A mold for making a slotted concrete floor comprising, in combination, a central section having a pair of parallel inverted V channels bridged at their lower adjacent edges by a connecting member to define a trough, said central section being openable approximately at its midpoint to facilitate breaking the mold away from a completed cast floor section, support members at each end of the central section, said inverted V channels being bridged at each end by a closure terminating in a horizontal notch adapted to engage and overhang a corner of the support member, said closure including a tooth protruding below the overhanging edge of said notch, whereby said central section may be temporarily staked to its respective support member during assembly, and an upright form member overlying each support member and spaced from the central section and closures, said form member having an upright slot opposite the closures of one of said V channels.

References Cited
UNITED STATES PATENTS

| | | | |
|---|---|---|---|
| 1,059,974 | 4/1913 | Brown | 249—118 X |
| 1,103,247 | 7/1914 | Baker | 249—118 |
| 1,900,301 | 3/1933 | Read | 249—28 |
| 1,925,775 | 9/1933 | Qruik | 249—28 X |
| 2,356,603 | 8/1944 | Maschbanks | 249—118 |
| 2,445,894 | 7/1948 | Troid | 249—118 |
| 2,601,082 | 6/1952 | Ashman | 249—28 X |

J. HOWARD FLINT, Jr., Primary Examiner

U.S. Cl. X.R.

249—18, 28